United States Patent [19]

Greig et al.

[11] Patent Number: 4,783,733
[45] Date of Patent: Nov. 8, 1988

[54] FAULT TOLERANT COMMUNICATIONS CONTROLLER SYSTEM

[75] Inventors: David A. Greig, Menlo Park; David L. Hinders, Cupertino; William R. Goodman, Palo Alto, all of Calif.

[73] Assignee: Tandem Computers Incorporated, Cupertino, Calif.

[21] Appl. No.: 853,927

[22] Filed: Apr. 21, 1986

Related U.S. Application Data

[62] Division of Ser. No. 551,283, Nov. 14, 1983, Pat. No. 4,607,365.

[51] Int. Cl.[4] ............................................. G06F 15/20
[52] U.S. Cl. ............................................................ 364/200
[58] Field of Search ... 364/200 MS File, 900 MS File

[56] References Cited

U.S. PATENT DOCUMENTS

| | | | |
|---|---|---|---|
| 4,156,932 | 5/1979 | Robinson et al. | 364/200 |
| 4,322,793 | 3/1982 | Andersson et al. | 364/200 |
| 4,392,199 | 7/1983 | Schmitter et al. | 364/200 |
| 4,410,961 | 10/1983 | Dlugos et al. | 364/900 |
| 4,463,352 | 7/1984 | Forbes et al. | 340/825.05 |

Primary Examiner—Gareth D. Shaw
Assistant Examiner—Debra A. Chun
Attorney, Agent, or Firm—Townsend and Townsend

[57] ABSTRACT

The present invention relates to a system for controlling multiple communications lines, so that a computer system can operate with a single component failure. Two processors are used to control two communications controllers and each of the controllers control up to 15 line controllers. Each line controller has two ports and each port is connected to a communications controller thereby providing two communications paths to each processor. Two power supplies are also used to provide single failure fault-tolerance. A downloadable microprocessor is provided in combination with, but separate from, an interface board that is designed to meet various communication format specifications and the line controller comprises the two boards.

1 Claim, 3 Drawing Sheets

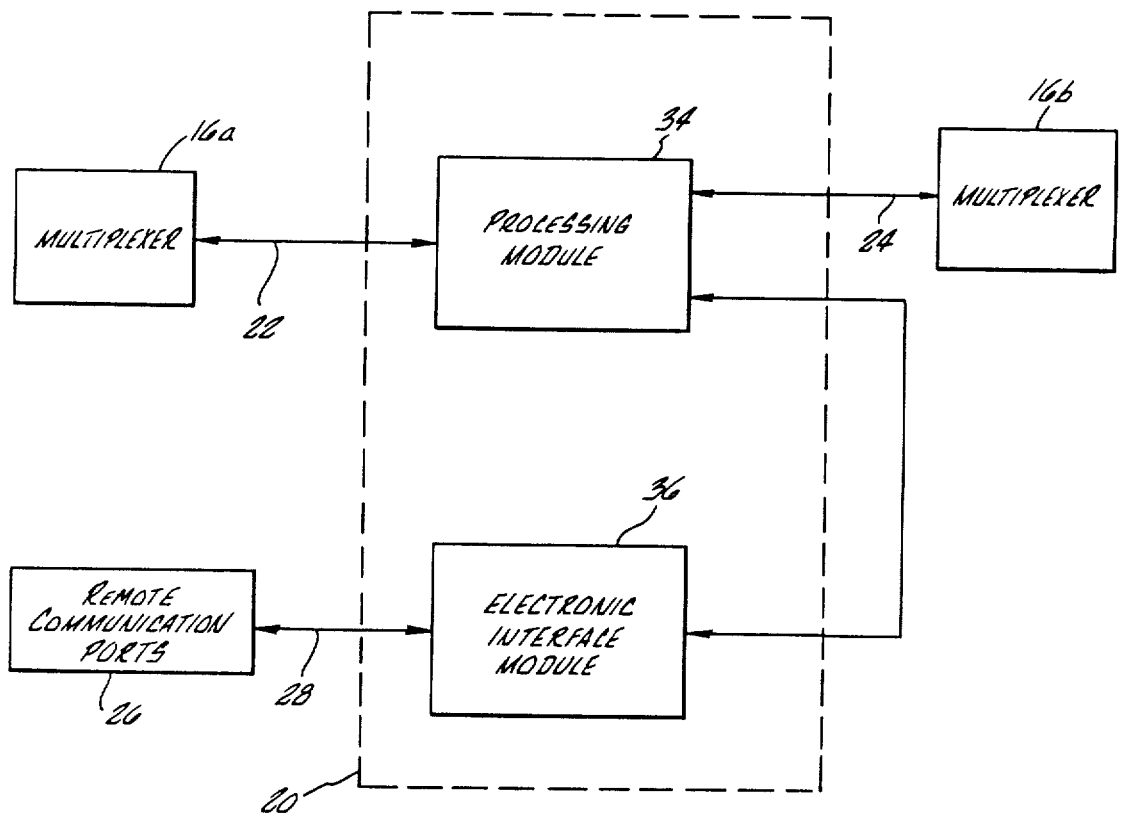
FIG_2

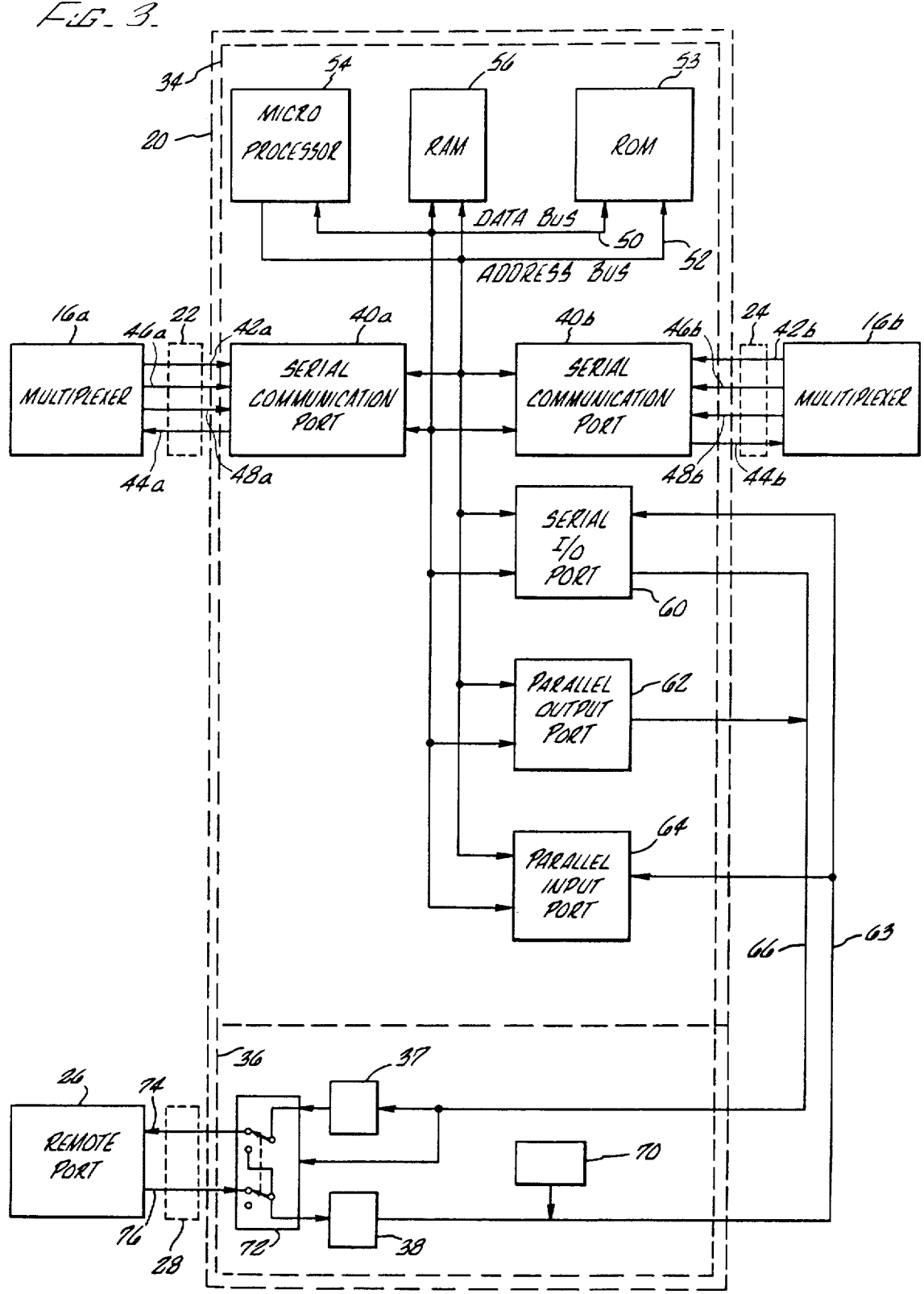

FAULT TOLERANT COMMUNICATIONS CONTROLLER SYSTEM

This is a division of application Ser. No. 551,283, filed Nov. 14, 1983, now U.S. Pat. No. 4,607,365.

BACKGROUND

The present invention relates to fault-tolerant communications controller systems. More specifically, it relates to using redundant components and redundant internal communications paths to assure continued operation-during single component failures.

Communication between computer systems is common. Whenever data is transmitted, either to a remote port for human use, to another node in a wide-area network, or to a transmission station in a switching network, a communications line must exist between the sending and receiving devices. This communications line is typically controlled by a communications controller.

To send data over the communications line, a processor must control the communications controller by sending it commands and receiving status reports. The processor uses the communications controller to communicate data to a plurality of remote ports. The processor communicates with the communications controller over a data bus. An error in the processor, controller, line or bus can disable communications. In the typical computer system, multiple communications lines are linked to the processor through the communications controller. Thus, a single error can terminate all communications between the processor and the remote ports.

To avoid this, one method employed by the prior art is to provide redundant busses between the processor and the communications controller. If one of the busses malfunctions, another is available to maintain communications. A further refinement is to provide for redundant processors so that if a processor malfunctions another can take its place.

The communications line may be connected to more than one controller to avoid losing the use of all the communications lines when a communications controller malfunctions. This requires a dual-port remote port such as a dual-port disk drive. However, there is the great expense of requiring two communications controllers per communications line. This is acceptable with magnetic disk drives, because a large capacity disk drive can be very expensive and therefore worth the expense of providing two communications controllers. Communications lines and communications controllers are generally not so expensive.

This approach requires that several types of multiport controllers be developed and used to control several types of remote ports.

These controllers are assigned the task of communicating data from the computer system to a multiplicity of input-output ports. Different input-output ports have different electronic line level, data line level and block level communications protocols.

A standard practice is to design a communications controller with a particular electronic line level, a data line level, and a block level protocol. The electronic line level protocols have different electronic specifications, in that, the voltage and current levels are specified for the protocol.

The data line level protocol is the logic formatting of the data within small data blocks. A block of data comprises a multiplicity of data characters which in turn comprise a multiplicity of data bits. The data line level protocol determines the format, for example, the number of start bits, stop bits, even or odd parity, bit cell time, phase encoding, NRZ coding. Within this format the individual bits or individual characters are transferred.

The block level protocol determines the format, for example start character, stop character, error correction/deletion codes, end characters. Within the block level format, blocks of character bits are transferred. The block level protocol is concerned with transferring blocks of data between the controllers. The block level protocol maintains the integrity of a block during its transfer by the use of protocol codes, e.g. send-data and ackowledge.

The computer system may be required to use several different types of communications controllers depending upon the variety of communications ports connected to the computer system. A traditional method for providing such a variety of communications for each type of communications controller is to design a particular communications port attached to the computer system. The ports attached may have different electronic line level protocols, data line level protocols and block level protocols. Consequently, computer manufacturers have been required to undertake the design and development of a variety of communications controllers.

Typically, each controller has employed a microprocessor of a particular design. Additionally, each type of electronic line level protocol requires a particular electronic interface hardware design. Manufacturing costs are directly related to the number of different modules required.

A power supply is required to power the communication controllers. The computer system is dependent on its only power supply, because every component depends upon that power supply for continued operation. The computer system will fail if its only power supply system fails.

SUMMARY

An object of the present invention is to provide reliable use of a computer system by using redundant busses, processors, communications controllers and power supplies. Another object of the invention is to enhance the reliability of the computer system by allowing dynamic allocation of its resources to maintain communications. Finally, it is an object of the present invention to provide within a communications controller a common processing module which will support a variety of communications protocols.

The present invention deviates from a conventional computer system configuration by having the communications controller comprised of communications controllers, multiplexers and line controllers. The communications controllers direct communications to and from a plurality of communication line controllers through the multiplexers. Each of the line controllers transfers information within a predetermined protocol format for communicating data between remote ports and the communication controllers through the multiplexers.

In a preferred embodiment, two processors and their respective busses are connected to two communications controllers so as to allow either processor to access either communications controller. Each communications controller is connected to a respective multiplexer, and each multiplexer is connected to and communicates with a plurality of line controllers. Each line controller has two ports, each of which is connected to one of the multiplexers.

Both the processors are of a common design. Both the communications controllers are of a common design. Both the multiplexers are of a common design and all of the line controllers are of a common design. These common designs decrease manufacturing costs.

Two power supplies and their respective monitors which are implemented in the multiplexer, are used to reliably supply power to the multiplexers and line controllers. Power levels are monitored periodically to detect a failure of either power supply.

The architecture uses redundant communication paths among the processors, controllers, multiplexers and line controllers. The redundant architecture provides the continuous operation to the line level even when a single component has failed.

Each component uses loop-back methods to test its connectivity with other parts of the system; that is, each component can electronically disconnect itself from a connected device and loop its port back upon itself for receiving its own transmitted data from a connected component. During a diagnostic test which enables the loop back, the computer, by executing a self-test, can determine if a component is operational.

Each component uses an echo-back method to test its functionality in that a component can store received data and subsequently retransmit it back to the original transmitting component.

The common line controller design is accomplished by providing a processing module in the form of a microprocessor module which will properly operate and communicate with one of several types interface modules. A multiplicity of electronic line, data line and block level protocols are enabled by the line controller. The microprocessor module stores and executes a variety of data line level and block level protocol software programs. The microprocessor module can be down-loaded with a particular program to support any one of a variety data line level protocols for a particular type of remote communications port.

Down-loading is the transfer of software programs from one processing module to another. Thus, one processor which is typically responsible for processing data at the system level can transfer programs to the microprocessing module which is typically responsible for processing at the subsystem level, that is, the data line level. Consequently, the term "down-loading" is used in the trade to describe and directionally reference the program transfer.

A typical transfer occurs on a system bus or a communications link and these communications are well known in the art. The microprocessor module receives down-loadable software protocol programs from the processors of the computer system. This permits upgrades or modification of the protocol program stored in the line controller while the line controller is operational, that is, the line controller is powered and communicating with the controller. A substitution of an interface module is made when a remote communications port requires a different electronic line level protocol.

The microprocessor module and the interface module within the line controller connect together over interface lines within the communications controller.

The line controller design provides the line controller with on-line maintenance. Computer system upgrades to a different electronic line level protocol only require changing the interface module. The user can down-load different software programs to the microprocessor module of the line controller for changing the data line level or block level protocols. These and other advantages will become apparent in the description of a preferred embodiment.

DRAWING DESCRIPTION

FIG. 2 is a hardware block diagram of a line controller connected to multiplexers and communications ports.

FIG. 3 is a detailed block diagram of a line controller connected to the multiplexer and the communications ports.

PREFERRED EMBODIMENT

Figure 1:
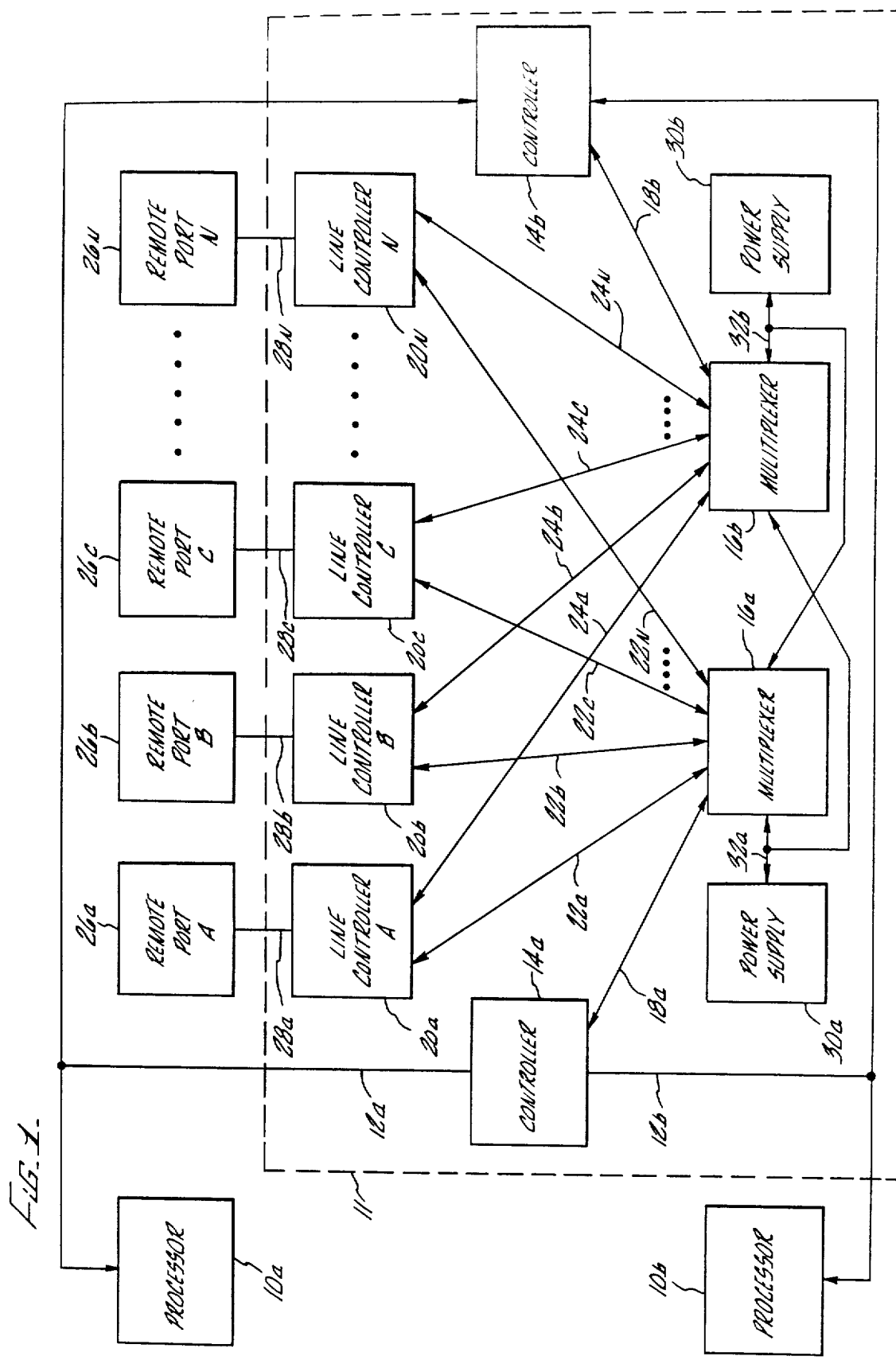
FIG. 1 is a block diagram of the system architecture.

Referring to FIG. 1, two processors 10a and 10b of a computer system, not shown, are used to control a communication controller system 11. Each processor 10a and 10b controls its own bus 12a and 12b, respectively. Two communications controllers 14a and 14b are connected to the busses 12a and 12b, respectively, and this connection allows either processor 10a or 10b to control either communications controllers 14a or 14b.

The communications controllers 14 are controlled by the processors 10 as is conventional in the art. The communications controllers 14a and 14b direct data communication through their respective multiplexers 16a and 16b on their respective links 18a and 18b. The multiplexers 16a and 16b communicate with line controllers 20a, 20b, 20c through 20n. The multiplexer 16a communicates to the line controllers 20a, 20b, 20c through 20n on multiplexer lines 22a, 22b, 22c through 22n, respectively. The multiplexer 16b communicates to the line controllers 20a, 20b, 20c through 20n on multiplexer lines 24a, 24b, 24c through 24n, respectively.

Each of the line controllers 20a, 20b, 20c through 20n is connected to a corresponding one of remote ports 26a, 26b, 26c through 26n, respectively, on their respective communications lines 28a, 28b, 28c through 28n. However, the line controllers 20 can be modified so that each line controller 20 can communicate to a plurality of remote port 26 types.

Each controller 14a or 14b uses a multiplexer 16a or 16b, respectively, to direct the operations of up to fifteen line controllers 20 and one of two power supplies 30a and 30b, respectively, through monitor lines 32a and 32b, respectively. Each of the line controllers 20 has two ports and each port is connected to a multiplexer 16a and 16b, respectively, so that either processor 10a or 10b can communicate through each and every line controller 20 even if one of the multiplexers 16a or 16b fails, or if one of the controllers 14a or 14b fails.

Two power supplies 30a and 30b are used to supply power. Both power supplies 30a and 30b are monitored by dual power monitors, not shown, within each of the multiplexers 16. The monitors, periodically report the state of the power supplies 30 to the processors 10. The multiplexers 16a and 16b receive data from the power supplies, 30a and 30b on monitor lines 32a and 32b, respectively. Each multiplexer 16a and 16b can monitor the voltage levels of both power supplies 30 through conventional analog to digital converters. However, multiplexer 16a can only disable the power supply 30a while multiplexer 16b can only disable the power supply 30b. Both multiplexers 16 can monitor and report the status of both power supplies 30.

The communication of data through the communication system 11 occurs on busses 12, links 18, multiplexer lines 22 and 24 and communication lines 28. The advantages of the present system are made possible by the redundant communication configuration. Even though the efficiency of the system is in part dependent upon the manner of communication, that is, the format for data and the type of command and data messages transferred, the fault tolerance advantage of the system is not so dependent.

The fault tolerance advantage of the system is enabled by the use of the redundant configuration and a variety of conventional formats, protocols and command-data messages. Data within predetermined formats and command-data messages transferred within predetermined protocols are well known in the art as are various types of line architectures.

Additionally, the processors 10, controllers 14 multiplexers 16 and line controllers 20 include intelligent machines in that they use internal processing circuits with memory components that store software programs and data bases.

The software programs are generally of two types and they are the operating system programs and the application programs. These types of programs are well known in the art. And, even though these programs aid the communicative efficiency of the system, the fault tolerance advantage can be realized independent of the specific programs actually used. Thus, the present invention relates specifically to the hardware architecture and not specifically to the format of communication or the programs employed.

Referring again to FIG. 1, the processors 10, controllers 14, multiplexers 16 and line controllers 20 have the ability to echo back, that is, receive, store and transmit back to the original sender. Thus, the processors 10 can, under program control, determine if a module has failed.

For example, the processor 10a wishes to determine why it can not communicate with the remote port 26a at a time when the processor 10a is communicating to the port 26a through multiplexer 16a. The processor 10a transmits a message to the port 26a through the multiplexer 16b and it is determined through an echo back that the communication was successful. The processor 10a should now deduce that there is a problem in the processors 10a-controller 14a-link 18a-multiplexer 16a-multiplexer line 22a-line controller 20a communication path. By the use of echo back diagnostic tests, the processor 10a can determine where in that communication path the error is occurring. For example, if the controller 14a successfully echos back and the multiplexer 16a fails to echo back, then the processor 10a can deduce that there is a failure on link 18a or in the multiplexer 16a.

In this manner, the processors 10 can determine where in the system there is a failure and the processors 10 can thereafter not use the failing component while the communication system 11 remains active, that is, the processors 10 can dynamically reallocate or disable resources so as to be single fault tolerant. Therefore, for example if multiplexer 16a fails, the communications lines 28 are still accessible to both processors 10 through the other communications controller 14b and multiplexer 16b.

If either processor 10a or 10b fails, the communicating lines 23 are still accessible to the other processor 10 because both control processors 10 can control the communications controllers 14. Processors 10 may also reallocate line controllers 20 between the communications controllers 14 dynamically as need and priority require.

Lastly, the processors 10 can perform checks on each other to determine if one of the processors 10 has failed. This can be accomplished by having each processor execute the same program with inter-processor checking, that is, each processor 10 checks the results of the other. The failing processor is then disabled.

Referring to FIG. 1 and 2, a line controller 20 includes two modules. The first is a processing module 34 and the second is an electronic interface module 36. Different various electronic interface modules 36 can be used with one processing module 34 which serves as a common processing module and is preferably a microprocessor module. The multiplexers 16a and 16b of a computer system, not shown, will communicate programs to the processing module 34 from the processors 10a and 10b of a computer system, not shown, when downloading of data program to the processing module 34 as desired by the processors 10a and 10b. The data programs contain the information which the processing module 34 can effect a particular communications protocol through the electronic module 36 to the remote ports 26.

Referring to FIG. 3, the electronic interface module 36 is a hardware module that includes various line drivers 37 and line receivers 38. The line drivers 37 and the line receivers 38 have particular electronic specifications, in that they have specified current and voltage levels consistent with the electronic line level protocol desired, such as RS232. The line drivers 37 and line receivers 38 communicate data to and from the remote communications ports 26.

The electrical interface module board 36 is changed to effectuate a change in the electronic line level protocol of the line controller 20. This requires a manual change of the electronic interface module 36. The protocol programs loaded into the processing module 34 describes the format requirements in which the data is to be transferred. The electronic interface module 36 operates consistent with prescribed electronic specifications of the desired protocol.

The multiplexers 16a and 16b communicate data to the processing module 34 through serial communications ports 40a and 40b. The communications ports 40a and 40b transmit and receive serial data to and from the multiplexers 16a and 16b. The communications ports 40a and 40b are respectively connected to the communication links 22 and 24 which comprise a multiplicity of serial unidirectional data and clocking lines 42a, 44a, 46a and 48a, and 42b, 46b and 48b, respectively. The communications ports 40 are each connected to two unidirectional lines 42 and 44 to effectuate transfers of serial data. Serial receive data is transmitted on line 42 into each of the serial communications ports 40. The receive data is clocked by clocking signals on line 46. Serial transmit data is transmitted on line 44 out of each of the serial communications ports 40. The transmit data is clocked by clocking signals on line 48. The clocking lines 46 and 48 are controlled by the multiplexers 16. The serial communications ports 40 of the processing module 34 are each a conventional device 6854, which provides for bit synchronous communications.

The serial communications ports 40 are each connected to a data bus 50 and an address bus 52 of the processing module 34. A microprocessor 54, RAM (random access memory) 56, ROM (read only memory) 58, serial input-output port 60, parallel output port 62 and parallel input port 64 are also connected to the address bus 52 and the data bus 54 of the processing module 34.

RAM 56, ROM 58 and microprocessor 54 are connected in a conventional configuration. The ROM 58 stores operating system programs that aid the transfer of data between the multiplexers 16 and the RAM 56. Additionally, the operating system programs in the ROM 58 cause the microprocessor 54 to execute protocol application programs that are down-loaded and stored in the RAM 56. The remaining storage capacity of the RAM 56 is used for data buffering between the serial communications ports 40 that are connected to the multiplexers 16, and the input-output serial port 60, the parallel input port 64, and the parallel output port 62.

The line drivers 37 and line receivers 38 communicate the data between the remote communications ports 26 and the processing module 34. The serial input-output port 60 is programmable by the microprocessor 54. The microprocessor 54 programs the serial input-output port 60 while under protocol application program control. Thus, the protocol is in part programmed into the serial input-output port 60. The serial input-output port 60 is connected to the electrical interface module 36 through the output lines 66 and input lines 68. The microprocessor 54 controls the address bus 52 and data bus 50 to transfer data between the microprocessor 54 or RAM 56 and the serial input-output port 60, the parallel input port 64 or the parallel output port 64.

The serial input-output port 60 is a conventional component, Z80SI0. The parallel input port 64 and parallel output port 62 comprise 74LS244 buffers and 74LS273 latches.

The line drivers 37 and line receivers 38 are of particular components depending upon the electrical protocol predetermined by the system. Protocols RS232, RS423, and RS422 are conventional electronic line level protocols.

The line drivers 37 may be National part 75150, Texas Instrument 75150, National part 1488 while the line receivers 38 may be Texas Instruments part 75154, National part 1489 for the RS232 protocol which is a bipolar plus or minus 24 volt line protocol.

The line drivers 37 may be Texas Instrument part 75156, Fairchild part 9636 or National part 3691 while the line receivers 38 may be National part 26LS32 or Advance Micro Devices 26LS33 for the RS423 protocol which is a plus or minus 5 volt bipolar single line protocol.

The line drivers 37 may be the National part 3691, Advance Micro Devices part 26LS31, Texas Instruments part 75174 or the Motorola part 3487 while the line receivers 38 may National part 26LS32 or Advance Micro Devices 26LS32 for the RS422 protocol which is a zero to five volt unipolar differential line protocol.

The choice of line drivers 37 and line receivers 38 to be mounted on the electronic interface module 36 depends upon the protocol implemented on a particular electronic interface module 36.

The manufacturer who has built several types of modules to implement respective protocols need only change manually the electronic interface module 36 and not the entire line controller 20.

Additionally, the protocol application programs need not be changed manually because the protocol application programs may be down-loaded through the multiplexers 16 into the RAM 56 and executed by the microprocessor 54.

The electronic interface module 36 has a storage ciruit 70 for identifying the type of electronic interface module 36. The storage circuit 70 present outputs on the input lines 68. These outputs on lines 68 are presented when the storage circuit 70 is enable by the output lines 66. The information presented onto the input lines 68 by the storage circuit 70 represents the type of electrical interface module 36 that is presently configured with the processing module 34. The microprocessor 54 can now identify the type of electrical interface module 36 with which it is configured.

The microprocessor 54 can read from the electrical interface module 36 this information which is an identifier. The processing module 34 can store this identifier information and report to the processors 10.

The electronic interface module 36 includes a loop-back circuit 72 which is controlled by the microprocessor 54 through the output lines 66. The loop-back circuit is connected to the communication line 28 which comprises of an output communication line 74 and an input line 76. The loop-back circuit 72 causes the remote communication port 26 to be disconnected from the electronic interface module 36 and causes the output communication lines 74 that are connected to the line drivers 37, to be connected to the line receivers 38 when activated by the microprocessor 54 through the output lines 66. Output data signals on the output communication lines 74 are connected to the input communication lines, that is, the output communication lines 74 are looped back when the loop-back circuit 72 is activated.

It should now become apparent that the processors 10 can cause data to be transmitted out to a line controller 20 and looped back and received by the processors 10 so as to enhance diagnostic and fault indentification functions.

The processors 10 can enhance diagnostics by down-loading diagnostic programs into the line controllers 20. The line controllers 20 use these diagnostic programs to effectuate self-testing by using the loop back circuit 72.

The loop-back circuit 72 in combination with the echo-back function enhances the processors 10 ability to perform fault identification and resource allocation as discussed.

It should also become apparent that by isolating the remote port 26 during the loop back activation, the remote port 26 cannot affect the fault identification process because it is not electrically connected to the communication system 11.

The controllers 14 and multiplexers 16 may have like loop-back circuits, not shown. It should now become apparent that with the loop-back and echo-back functions, complete fault identification is possible.

We claim:

1. A line controller module for providing communication between a processor and any one of a wide variety of remote ports, the processor transmitting and receiving data in a first block level format and in a first data line level format and the remote port transmitting and receiving data in a second block level format and in a second data line level format and in an electronic line level format, with the processor being provided with information identifying the second format and being capable of downloading different software routines to the line controller and with the software routines being capable of converting the block level format and the data line level format, the line controller module comprising:

(a) a chosen one of a plurality of manually replaceable interface circuits, each such interface circuit providing a different electronic line level format and line level protocol to a remote port, said chosen interface circuit manually plugged into said line controller module and providing the line level format and line level protocol required by said remote port, thereby accommodating said remote port; and (b) processing means for converting data transmitted from said processor to said remote port from the first block level format and the first data line level format to the second block level format and the second data line level format, and for converting data transmitted from said remote port to said processor from the second block level format and the second data line level format to the first block level format and the first data line level format, with the processing means controlled by software downloaded from said processor.

* * * * *